United States Patent
Dispenza et al.

(10) Patent No.: US 8,606,054 B2
(45) Date of Patent: Dec. 10, 2013

(54) ELECTRICALLY DRIVEN OPTICAL FREQUENCY SHIFTER USING COUPLED WAVEGUIDES

(75) Inventors: Massimiliano Dispenza, Rome (IT);
Anna Maria Fiorello, Rome (IT);
Mauro Varasi, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 167 days.

(21) Appl. No.: 12/673,357

(22) PCT Filed: Aug. 14, 2007

(86) PCT No.: PCT/IT2007/000587
§ 371 (c)(1),
(2), (4) Date: Apr. 22, 2010

(87) PCT Pub. No.: WO2009/022361
PCT Pub. Date: Feb. 19, 2009

(65) Prior Publication Data
US 2011/0182543 A1    Jul. 28, 2011

(51) Int. Cl.
*G02F 1/05* (2006.01)
(52) U.S. Cl.
USPC .................................. 385/2; 385/3; 29/825
(58) Field of Classification Search
USPC ................................ 385/2, 1, 3; 29/825
See application file for complete search history.

(56) References Cited

U.S. PATENT DOCUMENTS

| | | | |
|---|---|---|---|
| 5,009,477 A * | 4/1991 | Alferness et al. | 385/17 |
| 5,022,731 A * | 6/1991 | Maerfeld et al. | 359/332 |
| 5,166,942 A * | 11/1992 | Cardimona et al. | 372/21 |
| 6,141,141 A | 10/2000 | Wood | |
| 6,760,493 B2 * | 7/2004 | Pruneri et al. | 385/8 |
| 2001/0037473 A1 | 11/2001 | Matsuura et al. | |
| 2001/0046341 A1 * | 11/2001 | Nakabayashi | 385/14 |

(Continued)

FOREIGN PATENT DOCUMENTS

| | | |
|---|---|---|
| CN | 1191428 A | 8/1998 |
| EP | 0855617 A2 | 7/1998 |
| EP | 1 424 591 A1 | 6/2004 |
| JP | 09171201 A * | 6/1997 |

OTHER PUBLICATIONS

International Search Report in corresponding PCT/IT2007/000587 dated May 30, 2008.

(Continued)

*Primary Examiner* — Mark Robinson
*Assistant Examiner* — Andrew Jordan
(74) *Attorney, Agent, or Firm* — Marshall, Gerstein & Borun LLP

(57) ABSTRACT

Disclosed herein is an optical frequency shifter (1) provided with: an electro-optical substrate (3) having a main surface (3a); an optical waveguide structure (2) formed in the substrate (3) and having two waveguide portions (7), which are spaced apart by a distance (S) such as to ensure mutual optical coupling therebetween; and an electrode structure (10) arranged above the main surface (3a) of the substrate (3) and having at least a first electrode (11). The substrate (3) has a Z-cut crystalline structure with Z crystal axis orthogonal to the main surface (3a) and comprises two oppositely poled portions (20, 21) having opposite orientations of the Z crystal axis; the two waveguide portions (7) are arranged underneath the first electrode (11), each in a respective one of the two oppositely poled portions (20, 21).

13 Claims, 2 Drawing Sheets

(56) References Cited

U.S. PATENT DOCUMENTS

| | | | |
|---|---|---|---|
| 2003/0002766 A1* | 1/2003 | Pruneri et al. | 385/2 |
| 2003/0031400 A1* | 2/2003 | Pruneri | 385/14 |
| 2006/0228065 A1* | 10/2006 | Burns | 385/3 |
| 2013/0084076 A1* | 4/2013 | Williams et al. | 398/141 |

OTHER PUBLICATIONS

Written Opinion in corresponding PCT/IT2007/00587 dated May 30, 2008.

Desormiere et al., "An Integrated Optic Frequency Translator for Microwave Lightwave Systems," *Journal of Lightwave Technology* 8(4) 506-513 (Apr. 1990).

Lucchi et al., "Very low voltage single drive domain inverted $LiNbO_3$ integrated electro-optic modulator," *Optics Express* 15(17) 10739-10743 (Aug. 2007).

Notification of the Second Office Action from the Chinese Patent Office for Chinese Application No. 200780101078.0, dated Apr. 25, 2012.

\* cited by examiner

— SYMMETRIC MODE $S_\omega$
═ ANTISYMMETRIC MODE $A_{\omega+\Omega}$

ELECTRICALLY DRIVEN OPTICAL FREQUENCY SHIFTER USING COUPLED WAVEGUIDES

CROSS-REFERENCE TO RELATED APPLICATIONS

This application is the U.S. national phase of International Application No. PCT/IT2007/000587, filed Aug. 14, 2007.

TECHNICAL FIELD OF THE INVENTION

The present invention relates in general to an electrically driven optical frequency shifter, in particular for use in an optical system to shift a frequency of an optical signal propagating in an optical waveguide to very high frequencies.

BACKGROUND ART

As is known, since the early days of the telephone and telegraph, communications signals have traditionally been transmitted over copper wires and cables. In recent years, however, an increasing volume of communications signals are transmitted in the form of light beams over optical waveguides. Various types of peripheral equipments, such as connectors and switches based on optical waveguides have been developed. In particular, a technology known as integrated optics is widely used in handling optical communications signals. Using this technology, communications signals in the form of light beams are transmitted through optical waveguides formed in substrates made of electro-optical materials such as lithium niobate ($LiNbO_3$), which is probably the most widely used material due to its enhanced electro-optical properties and to the possibility of making low-loss optical waveguides.

Although integrated optics is now widely used in transmitting signals, fulfillment of continuous demand for optical devices operating at higher and higher frequencies is limited by the difficulty of making optical frequency shifters with appropriate characteristics.

FIG. 1 shows a standard representation of an optical frequency shifter having an optical input, where an input optical signal with an input optical frequency is received, an electrical input, where an RF electrical drive signal with an electrical frequency in the microwave range is received to electrically drive the optical frequency shifter, and an optical output, where an output optical signal is supplied with an output optical frequency equal to the input optical frequency of the input optical signal increased of the electrical frequency of the electrical drive signal. FIG. 1 also shows the optical spectra of the input and output optical signals, as well as the time pattern of the electrical drive signal.

FIG. 2 show a schematic representation of a known optical frequency shifter 1, which basically includes an optical waveguide structure 2 formed in a substrate 3 (shown in the following FIG. 3) of, an electro-optical material, normally lithium niobate ($LiNbO_3$), in a conventional manner, for example by selectively diffusing titanium into the substrate 3.

The substrate 3 has an X-cut crystalline structure, i.e. a crystalline structure with an X crystal axis which is orthogonal to a main surface 3a of the substrate 3 (i.e. the surface of largest area); the orientation of the crystalline structure causes electrical and optical fields generated by the electrical drive signal and the input optical signal to couple mainly along a Z crystal axis of the crystalline structure, i.e. the electro-optical coupling along the other two crystal axes is negligible compared to the electro-optical coupling along the Z crystal axis.

In fact, the electro-optical effect causes the refractive index of the electro-optical material to change spatially as a function of intensity and direction of an external electrical field applied thereto. In particular, along a given spatial direction the refractive index changes proportionally to the intensity of the electrical field along that direction. The refractive index changes along the three crystal axes X, Y and Z of the electro-optical material may be computed by multiplying scalarly the electrical field vector by a 3×3 matrix of electro-optical coefficients. In the case of a $LiNbO_3$ crystal, among the 3×3 electro-optical coefficient matrix the electro-optical coefficient having the highest value is $r_{33}$ (≈30 pm/V), which relates the refractive index change experienced by electromagnetic waves polarized along the Z crystal axis to the component of the electrical field along the same axis.

The optical waveguide structure 2 comprises a Y-shaped waveguide structure 4 and a reversed Y-shaped waveguide structure 5 coupled in series. The Y-shaped waveguide structure 4 includes an input branch 6 configured to be coupled, in use, to an input optical fiber (not shown), and a pair of mutually optically coupled branches 7 branching off from the input branch 6. The reversed Y-shaped waveguide structure 5 comprises a pair of mutually optically uncoupled branches 8 coupled to respective mutually optically coupled branches 7 of the Y-shaped waveguide structure 4, and merging into an output branch 9 configured to be coupled, in use, to an output optical fiber (not shown). One of the mutually optically uncoupled branches 8 of the reversed-Y-shaped waveguide structure 5 is so structured to induce a phase change of π radians in the optical signal propagating therealong.

In particular, the two mutually optically coupled branches 7 of the Y-shaped waveguide structure 4 are spaced apart by a distance S (first inter-waveguide spacing) short enough to ensure mutual optical coupling, typically ranging from 5 to 10 μm, while the two mutually optically uncoupled branches 8 of the reversed-Y-shaped waveguide structure 5 are spaced apart of a distance D (second inter-waveguide spacing) high enough to prevent mutual optical coupling. Additionally, the coupling degree $\kappa_{COUP}$ of the mutually optically coupled branches 7 of the Y-shaped waveguide structure 4 is a function of the first inter-waveguide spacing S via a proportionality factor $e^{-\alpha S}$, where α is the inverse of the distance at which the coupling factor reduces to a fraction 1/e of the extrapolated value at zero distance.

The optical frequency shifter 1 further comprises 1-30 μm-thick electrically conductive electrode structure 10 formed of gold or similar metals above the main surface 3a of the substrate 3, in a conventional manner, over the mutually optically coupled branches 7 of the Y-shaped waveguide structure 4.

In particular, as shown in FIG. 3, the electrode structure 10 includes an inner electrode 11 arranged between the mutually optically coupled branches 7 of the Y-shaped waveguide structure 4, and a pair of outer electrodes 12 arranged outside the mutually optically coupled branches 7, on opposite sides of, and symmetrically to the inner electrode 11. A dielectric (e.g. $SiO_2$) buffer layer 13 is arranged between the main surface 3a of the substrate 3 and the electrode structure 10 to prevent or minimize absorption of optical power by the electrode structure 10.

The outer electrodes 12 are generally grounded, while the inner electrode 11 is supplied with an electrical drive signal, having an electrical frequency Ω and a momentum $\beta_\Omega$, which results in an RF drive voltage applied between the inner electrode 11 and the outer electrodes 12. The RF drive voltage generates opposite electrical fields between the inner electrode 11 and the outer electrodes 12; the electrical fields have a direction substantially parallel to the main surface 3a (and to the Z crystal axis) and traverse a respective one of the mutually optically coupled branches 7, with opposite orientations. As the only electro-optical coefficient with a non-negligible value is $r_{33}$, these opposite electrical fields induce opposite refractive index changes in the mutually optically coupled branches 7 of the Y-shaped waveguide structure 4.

An input optical signal, consisting of a single symmetric mode with propagation index $N_S$, optical frequency $\omega_S$ and momentum $\beta_S$, and received at the input branch 6 of the optical frequency shifter 1, propagates along the Y-shaped waveguide structure 4, which, due to the mutual optical coupling of its branches, is operatively seen by the input optical signal as a single waveguide which may support two distinct supermodes with opposite parity known as symmetric supermode and antisymmetric supermode. In the absence of other phenomena, i.e no intrinsic asymmetries and/or electrical perturbations only the symmetric supermode would propagate without exciting the antisymmetric supermode. Therefore, only a single symmetric supermode with the same power as that of the input optical signal, propagation index $N_S$, optical frequency $\omega_s$ and momentum $\beta_S$ starts propagating along the Y-shaped waveguide structure 4.

During the propagation, the symmetric supermode experiences the afore-mentioned opposite refractive index changes, and this results in the energy of the symmetric supermode transferring partially to the antisymmetric supermode, which starts propagating in addition to the symmetric supermode. The antisymmetric supermode has a frequency $\omega_A$ equal to the frequency $\omega_S$ of the symmetric supermode up-shifted of the frequency of the electrical drive signal applied to the inner electrode 11 ($\omega_A=\omega_S+\Omega$), a momentum $\beta_A$ equal to the momentum $\beta_S$ of the symmetric supermode up-shifted of the momentum $\beta_\Omega$ of the electrical drives signal applied to the inner electrode 11 ($\beta_A=\beta_S+\beta_\Omega$) (due to a momentum conservation constraint), and a propagation index $N_A$.

Therefore, at the output of the Y-shaped waveguide structure 4 both the residual symmetric supermode and the antisymmetric supermode are present, which enter the reversed Y-shaped waveguide structure 5, in each branch of which a composed optical signal propagates, having half of the power of the input optical signal and comprising both a symmetric mode with two lobes with equal sign, and an antisymmetric mode with two lobes of opposite signs. During the propagation along the reversed Y-shaped waveguide structure 5, a phase change of m radians is induced in one of the two composed optical signals, so obtaining in the output branch 9 of the reversed Y-shaped waveguide structure 5, where the two composed optical signals merge, the summation of the two lobes of the antisymmetric mode in a single output optical signal having a frequency $\omega_A$, and the cancellation of the two lobes of the residual symmetric mode.

A resonance frequency $\Omega$ of the optical frequency shifter 1, i.e. the electrical frequency $\Omega$ of the electrical drive signal which, when supplied to the electrical input of the optical frequency shifter, produces the maximum shift efficiency, is imposed by the design specifications of the optical frequency shifter itself, and in particular it is directly proportional to the coupling degree $\kappa_{COUP}$ of the mutually optically coupled branches 7 of the Y-shaped waveguide structure 4; the coupling degree $\kappa_{COUP}$ is, in turn, proportional to $e^{-\alpha S}$, where S is the first inter-waveguide spacing of the mutually optically coupled branches 7 as it is given by the following formulas:

$$\Omega = \frac{c(N_S - N_A)}{\lambda(n_{RF} + N_A)}$$

$$N_S - N_A \propto \kappa_{COUP} \propto e^{-\alpha S},$$

Thus an increase of operating frequency may be obtained by a reduction of the first inter-waveguide spacing S of the mutually optically coupled branches 7.

OBJECT AND SUMMARY OF THE INVENTION

The Applicant has experienced that the continuous demand for increasing resonant frequencies, and hence frequency shifts, of optical frequency shifters is very hard to fulfill due to the difficulty, if not the impossibility, of reducing the inter-waveguide spacing of the mutually optically coupled branches of the Y-shaped waveguide structure below certain values.

In fact, as previously described, in order to electro-optically couple the electrical and optical fields generated by the electrical drive signal and the input optical signal, so achieving the frequency shift, it is necessary that the optical signals flowing in the mutually optically coupled branches of the Y-shaped waveguide structure experience opposite refractive index changes so as to excite the antisymmetric supermode. In order to achieve this result, the mutually optically coupled branches are arranged between the inner electrode and the outer electrodes, where the electrical fields are parallel to the Z crystal axis and have opposite orientations.

Reducing excessively the inter-waveguide spacing of the mutually optically coupled branches of the Y-shaped waveguide structure would result in the mutually optically coupled branches being arranged underneath the inner electrode where the electrical fields are parallel to the X crystal axis and oriented in the same direction, so preventing any electro-optical coupling between the electrical and optical fields.

In view of the foregoing, the Applicant has noticed that the current architecture of the optical frequency shifters represents a bar to a significant increase in the resonance frequency, and hence in the frequency shift, achievable by known optical frequency shifters.

The objective of present invention is hence to provide an improved optical frequency shifter which overcomes the limitations of the known optical frequency shifters, so allowing higher operating frequencies of optical devices to be achieved.

This objective is achieved by the present invention in that it relates to an optical frequency shifter, as defined in the appended claims.

The present invention achieves the aforementioned objective by using an electro-optical substrate with a Z-cut crystalline structure and comprising two oppositely poled portions, i.e. portions having opposite orientations of the Z crystal axis, and by arranging the inner electrode centered above a boundary between the two oppositely poled portions, and finally by arranging the mutually optically coupled branches of the Y-shaped waveguide structure underneath the inner electrode, very close one to another, and on opposite sides of the boundary such that the mutually optically coupled branches of the Y-shaped waveguide structure are arranged in respective portions of the substrate having opposite orientations of the Z crystal axis.

The opposite orientations of the Z crystal axis in the two portions of the substrate cause the electro-optical coefficient $r_{33}$ to have opposite values in these portions, and hence, even though the mutually optically coupled branches of the Y-shaped waveguide structure are arranged in an area of the substrate (underneath the inner electrode) where the electrical fields are parallel to the Z crystal axis and oriented in the same direction, the optical signals flowing in the mutually optically coupled branches of the Y-shaped waveguide structure experience opposite refractive index changes, so exciting the antisymmetric supermode and achieving the desired frequency shift.

On the other hand, the significant reduction in the inter-waveguide spacing of the mutually optically coupled branches of the Y-shaped waveguide structure allows the coupling degree $\kappa_{COUP}$ to be significantly increased and hence the resonance frequency of the optical frequency shifter to be markedly increased too.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAIL DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Figure 1:
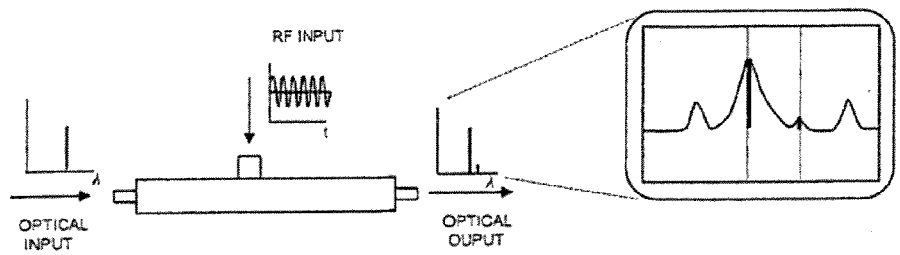
FIG. 1 shows a standard representation of an optical frequency shifter, along with plots associated to electrical and optical signals thereof.
Figure 2:
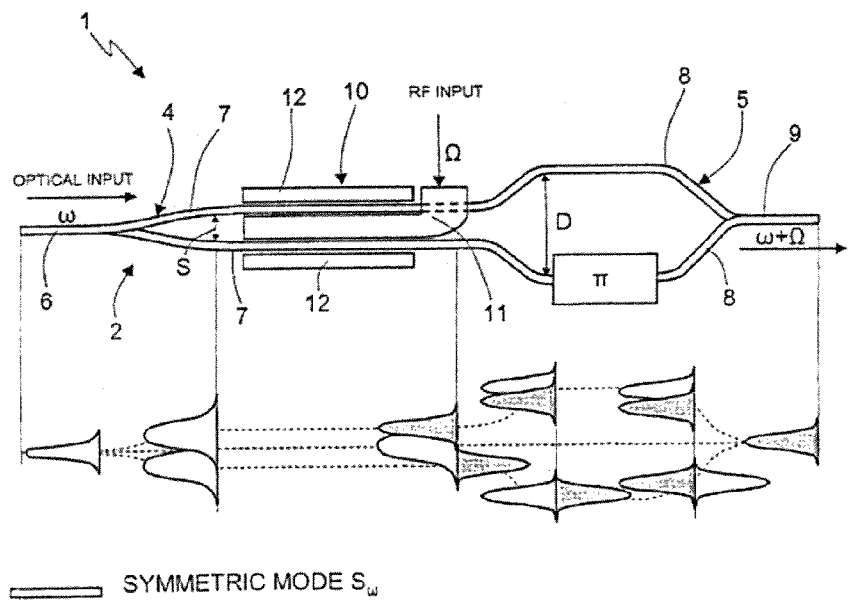
FIG. 2 shows a schematic representation of a known optical frequency shifter, and of optical modes propagating therealong.
Figure 3:
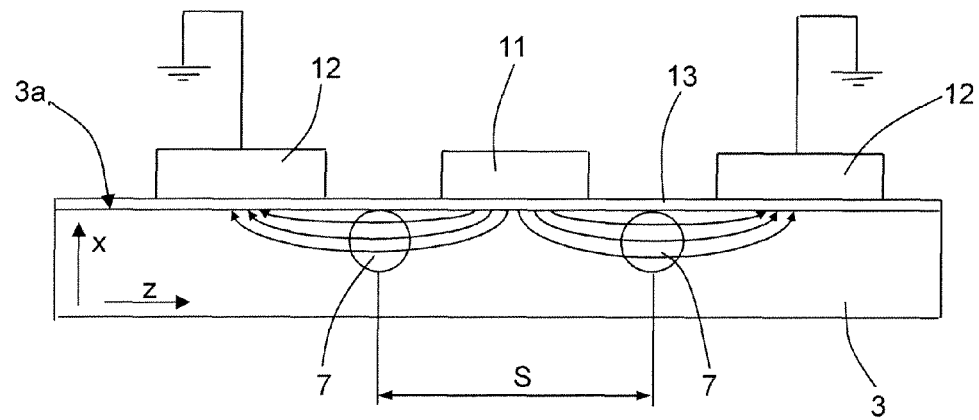
FIG. 3 shows a cross-section of an area of the optical frequency shifter of FIG. 2.
Figure 4:
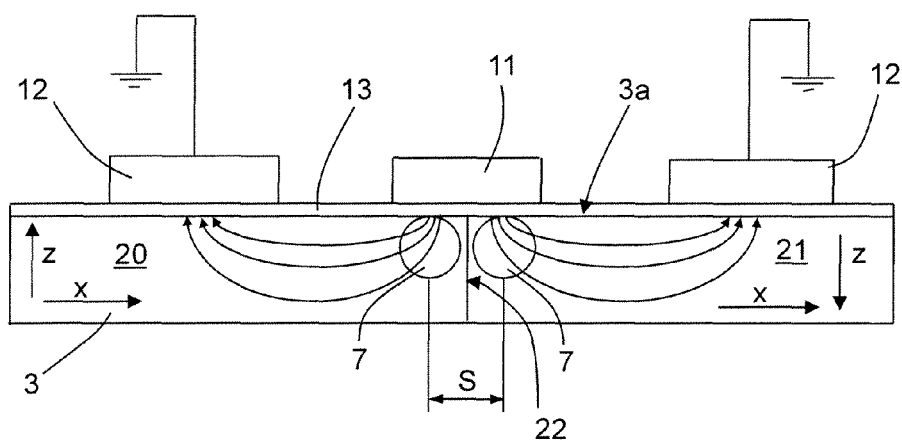
FIG. 4 shows a cross-section of an area of an optical frequency shifter according to a preferred embodiment of the present invention.

FIG. 4 shows a cross-section of an area of an optical frequency shifter, according to a preferred embodiment of the present invention, wherein same reference numerals and signs as those in FIG. 3 designate the same elements, which will not be described again.

As shown in FIG. 4, a crystalline structure of the substrate 3 has a Z-cut orientation, i.e. a crystalline structure with the Z crystal axis which is orthogonal to the main surface 3a of the substrate 3, above which the electrically conductive electrode structure 10 is arranged. This substrate configuration causes electrical and optical fields generated by an electrical drive signal and an input optical signal to couple mainly along the X crystal axis of the crystalline structure, i.e. the electro-optical coupling along the other two crystal axes is negligible compared to the electro-optical coupling along the X crystal axis. In fact, in this case, the electro-optical coefficient $r_{33}$ of the 3×3 electro-optical coefficient matrix with highest value relates the refractive index change experienced by electro-magnetic waves polarized along the X crystal axis to the component of the electrical field along the same axis.

Moreover, the substrate 3, at least in the area where the electrode structure 10 is arranged, is preliminarily treated so as to comprise two oppositely poled portions 20, 21, i.e. portions having opposite orientations of the Z crystal axis (as schematically shown by the arrows in FIG. 4); the opposite orientations cause the electro-optical coefficient $r_{33}$ to have opposite values in the two oppositely poled portions 20, 21, thus resulting in an induction of opposite refractive index changes by electrical fields equally oriented along the Z crystal axis.

Additionally, the inner electrode 11 of the electrode structure 10 is arranged above a boundary 22 between the two oppositely poled portions 20, 21 of the substrate 3, and the mutually optically coupled branches 7 of the Y-shaped waveguide structure 4 are arranged underneath the inner electrode 11, very close one to another (spaced apart by the first inter-waveguide spacing S), and on opposite sides of the boundary 22. Thus, the mutually optically coupled branches 7 are arranged in respective portions of the substrate 3 having opposite orientations of the Z crystal axis and opposite values of the electro-optical coefficient $r_{33}$. Moreover, the mutually optically coupled branches 7 are traversed by electrical fields equally oriented along the Z crystal axis, generated by the electrical drive signal supplied to the inner electrode 11 (the outer electrodes 12 being grounded). Accordingly, opposite refractive index changes are again induced in the mutually optically coupled branches 7 of the Y-shaped waveguide structure 4, thus permitting a transfer of energy from the symmetric supermode to the antisymmetric one. In the present embodiment of the invention, the first inter-waveguide spacing S between the mutually optically coupled branches 7 of the Y-shaped waveguide structure 4 ranges from 1 to 5 μm.

From the foregoing, it may be immediately appreciated that the Z-cut crystalline structure of the substrate 3 and the division of the substrate 3 in the two oppositely poled portions 20, 21 having opposite electro-optical coefficients allow to arrange the mutually optically coupled branches 7 under the inner electrode 11, in a position not allowed by known optical frequency shifters.

Therefore, the mutually optically coupled branches 7 are arranged at a distance that is much lower than in known optical frequency shifters. In this manner, a higher coupling degree $\kappa_{COUP}$ of the mutually optically coupled branches 7 of the Y-shaped waveguide structure 4 is achieved, and consequently an higher increase of the operating frequency.

Finally, it is clear that numerous modifications and variants can be made to the present invention, all falling within the scope of the invention, as defined in the appended claims.

In particular, the substrate 3 can be made of other z-cut electro-optical material, such as lithium tantalate ($LiTaO_3$), or Potassium Titanyl Phosphate (KTP).

The invention claimed is:

1. Optical frequency shifter comprising:
an electro-optical substrate having a main surface;
an optical waveguide structure formed in said substrate and having two waveguide portions, which are spaced apart by a distance such as to ensure mutual optical coupling therebetween; and
an electrode structure arranged above said main surface of said substrate and having at least a first electrode, characterized in that said substrate has a Z-cut crystalline structure with Z crystal axis orthogonal to said main surface and comprises two oppositely poled portions having opposite orientations of said Z crystal axis; and in that said two waveguide portions are arranged underneath said first electrode, each in a respective one of said two oppositely poled portions, wherein the two wavequide portions are spaced for inducing a resulting optical frequency shift in an optical signal provided to the optical wavequide structure.

2. The optical frequency shifter according to claim 1, wherein said electrode structure is operable to apply equally oriented electrical fields to said waveguide portions.

3. The optical frequency shifter according to claim 1, wherein said substrate is made of lithium niobate.

4. The optical frequency shifter according to claim 1, wherein said oppositely poled portions are separated by a boundary, said first electrode is arranged above said boundary and said two waveguide portions are arranged on opposite sides of said boundary.

5. The optical frequency shifter according to claim 1, wherein said electrode structure comprises two second electrodes, each arranged above a respective one of said two oppositely poled portions, on opposite sides of, and symmetrically to said first electrode.

6. The optical frequency shifter according to claim 5, wherein said two second electrodes are connected to a reference signal, and said first electrode is connected to an electrical drive signal input of said optical frequency shifter.

7. The optical frequency shifter according to claim 1, wherein said optical waveguide structure comprises an Y-shaped waveguide structure and a reversed-Y-shaped waveguide structure coupled in series; wherein said Y-shaped waveguide structure comprises an input branch configured to be coupled to an optical signal input and said waveguide portions branching off from said input branch, and said reversed-Y-shaped waveguide structure comprises a pair of mutually optically uncoupled branches coupled to said waveguide portions, and merging into an output branch configured to be coupled to an optical signal output.

8. The optical frequency shifter according to claim 7, wherein one of said mutually optically uncoupled branches of said reversed Y-shaped waveguide structure is so structured as to induce a phase change of $\pi$ radians in an optical signal propagating therealong.

9. A process for manufacturing an optical frequency shifter comprising:

providing an electro-optical substrate having a main surface;

forming an optical waveguide structure in said substrate, said waveguide structure having two waveguide portions, which are spaced apart by a distance such as to ensure mutual optical coupling therebetween; and forming an electrode structure above said main surface of said substrate, said electrode structure having at least a first electrode, wherein providing the electro-optical substrate comprises forming said substrate with a Z-cut crystalline structure having Z crystal axis orthogonal to said main surface and treating said substrate so as to form two oppositely poled portions having opposite orientations of said Z crystal axis; and in that:

forming said optical waveguide structure comprises arranging said two waveguide portions underneath said first electrode, each in a respective one of said two oppositely poled portions, wherein the two waveguide portions are spaced for inducing a resulting optical frequency shift in an optical signal provided to the optical waveguide structure.

10. The process according to claim 9, wherein said substrate is made of lithium niobate.

11. The process according to claim 9, wherein said oppositely poled portions are separated by a boundary, and forming an electrode structure comprises arranging said first electrode above said boundary, and arranging said two waveguide portions comprises arranging said two waveguide portions on opposite sides of said boundary.

12. The process according to claim 9, wherein forming an electrode structure comprises arranging two second electrodes each above a respective one of said two oppositely poled portions, on opposite sides of, and symmetrically to said first electrode.

13. The process according to claim 12, wherein forming an electrode structure further comprises connecting said two second electrodes to a reference signal, and connecting said first electrode to an electrical drive signal input of said optical frequency shifter.

* * * * *

UNITED STATES PATENT AND TRADEMARK OFFICE
CERTIFICATE OF CORRECTION

PATENT NO. : 8,606,054 B2  
APPLICATION NO. : 12/673357  
DATED : December 10, 2013  
INVENTOR(S) : Massimiliano Dispenza et al.

Page 1 of 1

It is certified that error appears in the above-identified patent and that said Letters Patent is hereby corrected as shown below:

In the Claims:

At Column 6, line 54, Claim 1, "Optical" should be -- An optical --.

At Column 7, line 2, Claim 1, "wavequide" should be -- waveguide --.

At Column 7, line 4, Claim 1, "wavequide" should be -- waveguide --.

Signed and Sealed this  
Seventh Day of April, 2015

Michelle K. Lee  
*Director of the United States Patent and Trademark Office*